United States Patent
Kopmels et al.

(10) Patent No.: US 7,976,277 B2
(45) Date of Patent: Jul. 12, 2011

(54) AIR-COOLED COMPONENT

(75) Inventors: Michiel Kopmels, Bristol (GB); Mark T Mitchell, Bristol (GB); Peter J Goodman, Bristol (GB); Keith C Sadler, Bristol (GB)

(73) Assignee: Rolls-Royce, PLC, London (GB)

( * ) Notice: Subject to any disclaimer, the term of this patent is extended or adjusted under 35 U.S.C. 154(b) by 931 days.

(21) Appl. No.: 11/976,286

(22) Filed: Oct. 23, 2007

(65) Prior Publication Data

US 2008/0112816 A1    May 15, 2008

(30) Foreign Application Priority Data

Nov. 9, 2006  (GB) .................................. 0622402.6

(51) Int. Cl.
*F01D 11/00* (2006.01)
(52) U.S. Cl. ...................................... 416/97 R; 415/115
(58) Field of Classification Search .................. 415/115; 416/90 R, 91, 95, 96 R, 97 R, 97 A
See application file for complete search history.

(56) References Cited

U.S. PATENT DOCUMENTS

| 5,246,340 | A | 9/1993 | Winstanley et al. |
| 6,874,988 | B2 | 4/2005 | Tiemann |
| 7,568,887 | B1 * | 8/2009 | Liang .......................... 416/97 R |
| 2004/0022630 | A1 | 2/2004 | Tiemann |
| 2005/0095119 | A1 | 5/2005 | Liang |
| 2005/0265835 | A1 | 12/2005 | Liang |

FOREIGN PATENT DOCUMENTS

| EP | 1 154 124 A1 | 11/2001 |
| EP | 1 191 189 A1 | 3/2002 |
| EP | 1 342 883 A2 | 9/2003 |
| EP | 1 342 883 A3 | 1/2005 |
| EP | 1 584 790 A2 | 10/2005 |
| EP | 1 731 710 A1 | 12/2006 |
| JP | A-61-118502 | 6/1986 |

* cited by examiner

*Primary Examiner* — Edward Look
*Assistant Examiner* — Dwayne J White
(74) *Attorney, Agent, or Firm* — Oliff & Berridge, PLC

(57) ABSTRACT

A component such as a turbine blade of a gas turbine engine has a cooling arrangement comprising a cascade impingement array in which cooling air flows from a supply chamber through impingement passages in webs to an internal passageway comprising first and second limbs. The cooling air flow through the limbs, provides improved heat transfer compared with continued impingement cooling in the chordwise direction of the blade.

11 Claims, 2 Drawing Sheets

AIR-COOLED COMPONENT

This invention relates to an air-cooled component, and is particularly, although not exclusively, concerned with an air-cooled aerofoil a component for a gas turbine engine, for example a turbine stator vane or turbine blade.

It is known for turbine blades and vanes in a gas turbine engine to be cooled using high pressure air drawn from the compressor of the engine. The cooling air bypasses the combustor and is therefore relatively cool compared to the temperature of the working gases flowing over the turbine blades and vanes. Typical cooling air temperatures are between 700° K and 900° K, whereas the working gas temperatures can be in excess of 2100° K. Cooling air drawn from the compressor to cool hot turbine components is not used fully to extract work from the turbine. The extraction of cooling air consequently has an adverse effect on the engine operating efficiency, and so it is important to use the cooling air as effectively as possible.

It is known for aerofoil components to be cooled by passing the cooling air through serpentine paths formed within the component. The serpentine paths commonly comprise passages extending spanwise of the component, connected together in series by reverse bends at or close to the ends of the component. In such arrangements, the flow of air within the component takes place in a generally radial direction with respect to the engine axis.

As an alternative, it is also known for the cooling air flow within an aerofoil component to take place in a generally chordwise direction. In such an arrangement, the interior of the component is divided into several chambers which extend spanwise of the component. Adjacent chambers are separated from each other by internal webs. The chambers communicate with one another through impingement passages which are oriented so that cooling air flowing through them is directed towards external walls of the component so as to achieve impingement cooling of those walls.

In the impingement cooling system, the cooling air is conventionally introduced into the aerofoil component at one end of the component, typically into one of the chambers at its radially inner end. Consequently, to flow chordwise, the cooling air must be turned through approximately 90° from the radial flow into the first chamber to a chordwise flow to pass into the adjacent chamber or chambers. This introduces aerodynamic losses which reduce the cooling effectiveness of the arrangement. Consequently, it has been considered undesirable to introduce further aerodynamic loses by causing further significant direction changes from the generally chordwise flow of air through the component. Instead, the cooling air continues to flow in the chordwise direction, finally emerging to the exterior through passages or slots at or close to the trailing edge of the component.

In both forms of cooling arrangement, the internal serpentine passageways and chambers communicate with the exterior of the component through film cooling holes, so that cooling air forms a film over the external surface of the component, so shielding the component from the hot working gases.

Impingement cooling is highly effective in the thicker parts of the components. Additionally, the pressure drops caused by the flow through the impingement assist in controlling flow through the film cooling holes to optimise film cooling. However, at the trailing edge of the component, where overheating is liable to occur, the heat transfer coefficient is limited by the geometry of the chamber or chambers near the trailing edge since, these chambers have a large flow cross-section relative to their length in the chordwise direction.

According to the present invention there is provided an air-cooled aerofoil for a gas turbine engine comprising a leading edge and a trailing edge joined by a wall, a leading edge chamber upstream of a cooling air supply chamber, and an internal passageway downstream of the cooling air supply chamber configured as first and second elongate limbs, one end of one limb being in communication with one end of the other limb; the leading edge chamber, cooling air supply chamber and internal passageway being defined by the wall and internal webs, characterised in that the cooling air supply chamber communicates with the leading edge chamber through impingement passages provided in the internal web separating the supply chamber and the leading edge chamber, and the first limb of the passageway communicates with the cooling air supply chamber through impingement passages in at least one of the other internal webs of the aerofoil.

The limbs of the internal passageway may communicate with each other at a reverse bend within the component.

The second limb of the internal passageway may communicate with the exterior of the component through cooling passages distributed along the second limb. The cooling passages may emerge at or close to an edge of the component, which edge is parallel to the second limb. Alternatively, or in addition, the second limb may communicate with the exterior of the component through an exhaust passage situated at the end of the second limb away from the end communicating with the first limb. The component may be elongate, in which case the exhaust passage may be situated at one end of the component.

The chamber may be a supply chamber, and the internal web may be one of at least two internal webs situated between the supply chamber and the internal passageway. The impingement passages may be oriented to direct cooling air flow at an external wall of the component, in which case the impingement passages in the respective webs may be oriented to direct flow at the external wall respectively on opposite sides of the component.

The supply chamber may be elongate, and have an inlet at one end and an outlet passage at the other end which communicates with the exterior of the component.

The component may be an aerofoil component of a gas turbine engine, such as a turbine blade or stator vane. If the component is an aerofoil component, the internal passageway, or at least the second limb of the internal passageway, may be provided in the trailing edge region of the component.

The supply chamber may communicate with a leading edge chamber disposed in the leading edge region of the aerofoil component through impingement passages in an internal web separating the supply chamber and the leading edge chamber.

For a better understanding of the present invention, and to show more clearly how it may be carried into effect, reference will now be made, by way of example, to the accompanying drawings, in which:—

Figure 1:
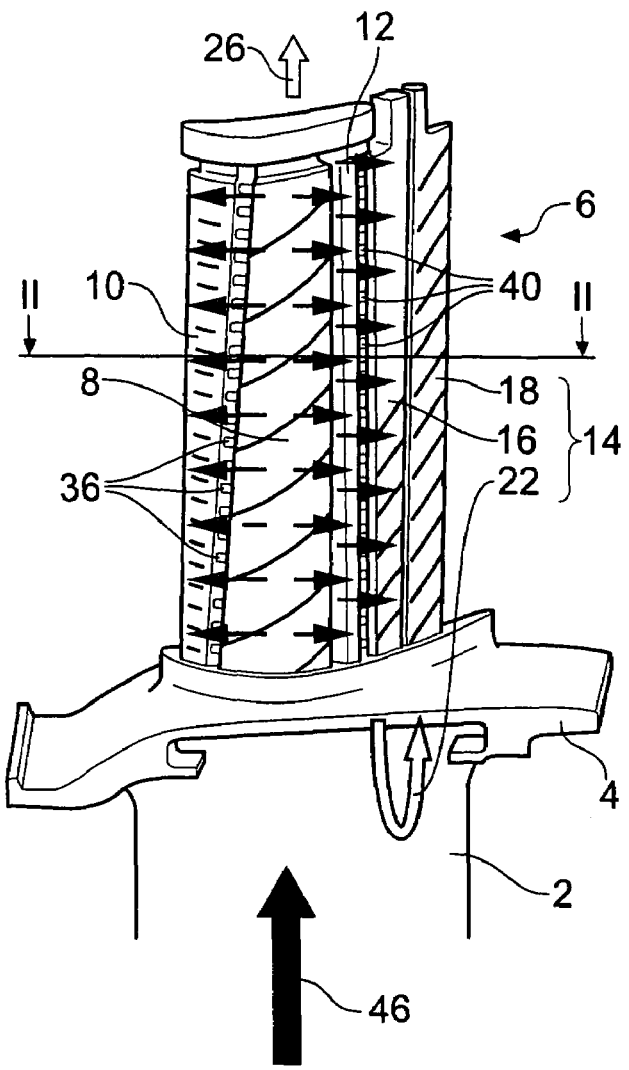
FIG. 1 represents a turbine blade of a gas turbine engine.

The blade shown in FIG. 1 has a root 2 configured to engage a turbine disc to retain the blade on the disc. The root 2 projects to one side of a platform portion 4, and an aerofoil portion 6 projects from the platform portion 4 on the side away from the root 2. The aerofoil portion 6 is represented in FIG. 1 as a "negative" of the aerofoil portion 6 as it appears in reality. Thus, in FIG. 1, the metal from which the component is made is omitted, and chambers and passages within the aerofoil portion 6 are shown as solid components. Thus, the aerofoil portion 6 is represented in FIG. 1 by the shape of a ceramic core by which the chambers and passages are formed during the casting of the component.

The aerofoil portion 6 has a hollow interior comprising a supply chamber 8, an upstream chamber 10 situated at the leading edge region of the blade, a downstream chamber 12 and a passageway 14. The passageway 14 comprises two substantially parallel limbs 16, 18 which are isolated from each other along their lengths by a continuous, unperforated web 20 (FIG. 2), but which communicate with each other as indicated by an arrow 22, at one end. Although the arrow 22 is shown disposed radially inwards of the portion 6, the communication between the respective ends of the limbs 16, 18 takes place through a reverse bend within the aerofoil portion 6.

It will be appreciated that the chambers 8, 10 and 12, and the limbs 16, 18, extend in the spanwise direction of the aerofoil component 6. The chambers 8, 10 and 12 communicate with the exterior of the blade through an outlet in the form of a dust hole represented by an arrow 26. In practice, the dust hole is formed by machining after the blade has been cast, and so does not have a counterpart in the core represented in FIG. 1.

Figure 2:
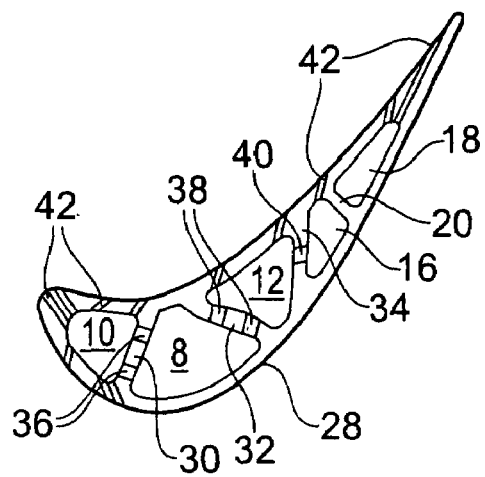
FIG. 2 is a sectional view taken on the line II-II in FIG. 1.

As shown in FIG. 2, the aerofoil portion 6 has an external wall 28 over which, in use of the blade, hot gas flows. The interior of the aerofoil portion 6 is divided by the web 20 and further webs 30, 32, 34 into the chambers 8, 10, 12 and the limbs 16, 18. The webs 30, 32, 34, unlike the continuous web 20, are perforated by impingement passages 36, 38 and 40 respectively. The chambers 8, 10, 12 and the limbs 16, 18 communicate with the exterior of the component through film cooling passages 42.

Figure 3:
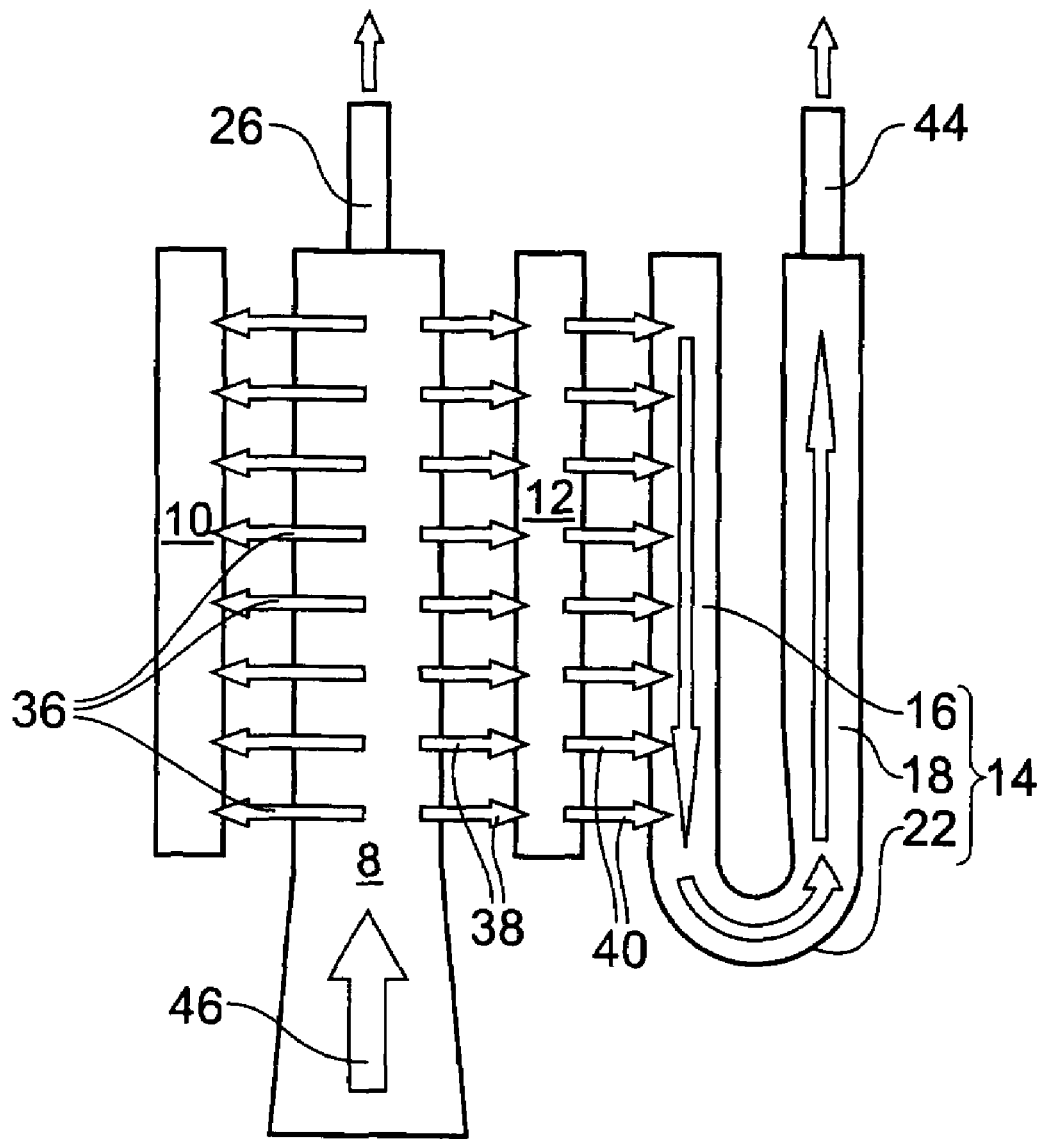
FIG. 3 is a diagrammatic view representing cooling air flow within the turbine blade of FIGS. 1 and 2.

Although not shown in FIG. 1, an exhaust passage 44 is provided at the end of the second limb 18 of the passageway 14, as represented in FIG. 3.

In use of the blade as described with reference to FIGS. 1 and 2, cooling air from a compressor of the engine is supplied to the supply chamber 8 at its radially inner end, as represented by an arrow 46. The air enters the chamber 8 and most of it passes, through the impingement passages 36, 38, to the adjacent chambers 10 and 12. From the chamber 12, the cooling air flows through the impingement passages 40 into the first limb 16 of the internal passageway 14. Some of the air entering the chambers 8, 10, 12 will flow through the dust hole 26, which serves as a dust hole to eliminate dust and similar solid matter from the cooling air to minimise the likelihood of blockage of the passages 30, 32 and 40, and the holes 42. Also, some air will flow from the chambers 10 and 12, and the limb 16, to the exterior through the film cooling holes 42.

It will be appreciated from FIG. 2 that the impingement passages 36, 38 and 40, and the webs 30, 32 and 34 in which they are situated, are oriented so that cooling air exiting from the passages 36, 38 and 40 is directed at the external wall 28 of the aerofoil portion 6. In particular, the passages 36 opening into the leading edge chamber 10 are disposed in two rows directed at the external wall 28 respectively on the pressure and suction sides of the aerofoil portion 6; the passages 38 in the web 32 are disposed in two rows, both directed at the external wall 28 on the pressure side; and the passages 40 in the web 34 are disposed in a single row directed at the suction side.

It will be appreciated that air entering the first limb 16 of the passageway 14 cannot cross the web 20 into the second limb 18. Instead, air entering the first limb 16 from the chamber 12 must flow radially inwardly of the aerofoil portion 6 to the reverse bend 22, and then flow into the second limb 18.

The flow through the blade is represented diagrammatically in FIG. 3, in which arrows with the respective reference numbers correspond to the impingement passages 36, 38 and 40.

It will be appreciated from FIG. 3 that the cooling air entering the first limb 16 from the chamber 12 has to turn through 90° to flow radially inwardly along the first limb 16 to the reverse bend 22. The cooling air then flows radially outwardly along the second limb 18. As the air progresses along the second limb 18, some of it flows through the film cooling holes 42 emerging on the pressure side of the aerofoil portion 6 adjacent the trailing edge, while the remainder flows through the exhaust passage 44.

Although the change of direction from the generally chordwise flow through the impingement passages 40 to the radially inward flow in the first limb 16 causes aerodynamic losses, it has been found that, despite these losses, the cooling effect achieved by the passageway 14 (comprising the limbs 16 and 18) is greater than if the limbs 16 and 18 do not communicate through the reverse bend 22, but instead communicate through further impingement passages in the web 20. It is believed that one reason for this is that the flow cross-section in the radial direction through the limbs 16 and 18 is much smaller than the flow cross-section through these limbs if the flow takes place in the chordwise direction. For example, if the aerofoil has a span of 50 mm and the limb 18 has a thickness of 2 mm measured across the width of the aerofoil and a width of 5 mm measured in the chordwise direction, the flow cross-section in the chordwise direction may be approximately 100 mm$^2$. For the same dimensions of the limb 18, the flow cross-section may be approximately 10 mm$^2$ for flow in the radial direction. Since the heat transfer coefficient is dependent on the flow cross-section and the length over which flow takes place, considerably improved heat transfer can be achieved with the arrangement as described above, without losing the benefits of impingement cooling in the thicker parts of the aerofoil portion 6.

A cooling arrangement in accordance with the present invention thus provides the benefits of a cascade impingement array in which the pressure loss resulting from flow through the passages 36, 38 and 40 can enable an increase in the size of the outlet passage 26, so enhancing tip cooling. At the same time, heat transfer at the trailing edge of the blade can be enhanced. Furthermore, formation of the web 20 as a continuous web without impingement cooling passages provides a simpler and cheaper manufacturing process.

In the embodiment described, the internal passage 14 comprising the limbs 16 and 18 is situated at the downstream end of the cascade impingement array comprising the webs 32 and 34 and the impingement passages 38 and 40. Alternatively the internal passageway 40 may be situated ahead of the cascade impingement array, or between two impingement arrays. Also, although the cascade impingement array between the supply chamber 8 and the trailing edge of the blade comprises two webs 32 and 34 with impingement passages 38 and 40, only one such web, or more than two such webs, may be provided. That is to say, while a single chamber 12 is provided between the supply chamber 8 and the first limb 16 in the embodiment described, no such chamber, or more than one such chamber, may be provided.

It will also be appreciated that, instead of the single cooling air supply represented by the arrow 46, there may be a plurality of cooling air entry points. Similarly, there may be more than one outlet passage 26 in the form of a plurality of dust holes. The dust holes may pass directly to the turbine annulus (ie into the gap between the blade tip and the surrounding case), or it may pass through a tip cooling passage at the blade tip.

The invention claimed is:

1. An air-cooled aerofoil for a gas turbine engine comprising a leading edge and a trailing edge joined by a wall, a leading edge chamber upstream of a cooling air supply chamber, and an internal passageway downstream of the cooling air supply chamber configured as first and second elongate limbs, one end of one limb being in communication with one end of the other limb; the leading edge chamber, cooling air supply chamber and internal passageway being defined by the wall and internal webs, wherein the cooling air supply chamber communicates with the leading edge chamber through impingement passages provided in the internal web separating the supply chamber and the leading edge chamber, and the first limb of the passageway communicates with the cooling air supply chamber through impingement passages in at least one of the other internal webs of the aerofoil.

2. A component as claimed in claim 1, wherein the first and second limbs communicate with each other through a reverse bend.

3. A component as claimed in claim 1, wherein the second limb communicates with the exterior of the component through cooling passages distributed along the second limb.

4. A component as claimed in claim 1, wherein the second limb communicates with the exterior of the component through an exhaust passage at the end of the second limb away from the end communicating with the first limb.

5. A component as claimed in claim 4, wherein the component is elongate, the exhaust passage being at an end of the component.

6. A component as claimed in claim 1, wherein the cooling air chamber comprises a supply chamber provided with a cooling air inlet.

7. A component as claimed in claim 1, wherein the impingement passages are provided in at least two internal webs situated between the supply chamber and the internal passageway, the impingement passages in the respective internal webs directing flow at an external wall of the component on respective opposite sides of the component.

8. A component as claimed in claim 1, wherein the supply chamber is elongate, the cooling air inlet being situated at one end and an outlet, communicating with the exterior of the component, being situated at the other end.

9. A component as claimed in claim 8, wherein the second limb of the internal passageway is situated in the trailing edge region of the aerofoil component.

10. A component as claimed in claim 9, wherein the second limb of the internal passageway extends parallel to the trailing edge of the aerofoil component.

11. A component as claimed in claim 1 in which the first and second elongate limbs are substantially parallel with each other.

* * * * *